(12) United States Patent
Shimizu

(10) Patent No.: US 8,110,515 B2
(45) Date of Patent: Feb. 7, 2012

(54) OPTICAL GLASS

(75) Inventor: Koji Shimizu, Sagamihara (JP)

(73) Assignee: Ohara, Inc., Sagamihara-shi, Kanagawa (JP)

( * ) Notice: Subject to any disclaimer, the term of this patent is extended or adjusted under 35 U.S.C. 154(b) by 195 days.

(21) Appl. No.: 12/083,016

(22) PCT Filed: Sep. 8, 2006

(86) PCT No.: PCT/JP2006/317882
§ 371 (c)(1),
(2), (4) Date: Apr. 3, 2008

(87) PCT Pub. No.: WO2007/043262
PCT Pub. Date: Apr. 19, 2007

(65) Prior Publication Data
US 2009/0131240 A1    May 21, 2009

(30) Foreign Application Priority Data
Oct. 11, 2005  (JP) ................ 2005-295823

(51) Int. Cl.
*C03C 3/068* (2006.01)
*C03C 3/066* (2006.01)
*C03C 3/15* (2006.01)

(52) U.S. Cl. ............... 501/78; 501/79; 501/77; 501/50; 501/51

(58) Field of Classification Search .................. 501/77, 501/78, 79, 50, 51
See application file for complete search history.

(56) References Cited

U.S. PATENT DOCUMENTS

| | | | | |
|---|---|---|---|---|
| 3,958,999 A * | 5/1976 | Izumitani et al. | ............... | 501/51 |
| 4,226,627 A * | 10/1980 | Inoue et al. | ............... | 501/50 |
| 4,732,876 A * | 3/1988 | Nagamine et al. | ............... | 501/78 |
| 6,187,702 B1 * | 2/2001 | Morishita | ............... | 501/78 |
| 6,251,813 B1 * | 6/2001 | Sato | ............... | 501/78 |
| 6,645,894 B2 * | 11/2003 | Endo | ............... | 501/51 |
| 6,713,419 B1 * | 3/2004 | Onozawa et al. | ............... | 501/78 |
| 6,753,281 B2 * | 6/2004 | Uehara | ............... | 501/78 |
| 6,797,659 B2 * | 9/2004 | Uehara | ............... | 501/78 |
| 6,844,279 B2 * | 1/2005 | Hayashi et al. | ............... | 501/50 |
| 6,977,232 B2 * | 12/2005 | Hayashi et al. | ............... | 501/79 |
| 7,138,348 B2 * | 11/2006 | Uehara | ............... | 501/64 |
| 7,138,349 B2 * | 11/2006 | Uehara et al. | ............... | 501/78 |
| 7,335,614 B2 * | 2/2008 | Uehara et al. | ............... | 501/78 |
| 7,368,404 B2 * | 5/2008 | Uehara | ............... | 501/78 |
| 7,490,485 B2 * | 2/2009 | Endo | ............... | 65/63 |
| 7,491,667 B2 * | 2/2009 | Hayashi | ............... | 501/51 |
| 7,501,369 B2 * | 3/2009 | Tachiwana | ............... | 501/78 |
| 7,563,738 B2 * | 7/2009 | Uehara | ............... | 501/78 |
| 7,576,020 B2 * | 8/2009 | Hayashi | ............... | 501/78 |
| 7,598,193 B2 * | 10/2009 | Endo | ............... | 501/78 |
| 7,622,409 B2 * | 11/2009 | Hayashi | ............... | 501/50 |
| 2003/0100433 A1 * | 5/2003 | Hayashi et al. | ............... | 501/79 |
| 2003/0211929 A1 * | 11/2003 | Hayashi et al. | ............... | 501/78 |
| 2004/0116272 A1 * | 6/2004 | Uehara | ............... | 501/78 |
| 2004/0220041 A1 * | 11/2004 | Isowaki et al. | ............... | 501/78 |
| 2004/0235638 A1 * | 11/2004 | Uehara et al. | ............... | 501/78 |
| 2005/0049135 A1 * | 3/2005 | Hayashi | ............... | 501/78 |
| 2005/0085371 A1 * | 4/2005 | Tachiwama | ............... | 501/78 |
| 2005/0107240 A1 * | 5/2005 | Uehara | ............... | 501/78 |
| 2005/0197243 A1 * | 9/2005 | Hayashi | ............... | 501/50 |
| 2005/0204776 A1 * | 9/2005 | Hayashi | ............... | 65/102 |
| 2005/0209085 A1 * | 9/2005 | Endo | ............... | 501/50 |
| 2006/0079389 A1 * | 4/2006 | Hayashi | ............... | 501/50 |
| 2006/0100085 A1 * | 5/2006 | Uehara | ............... | 501/78 |
| 2006/0105900 A1 * | 5/2006 | Kasuga et al. | ............... | 501/78 |
| 2006/0189473 A1 * | 8/2006 | Endo | ............... | 501/78 |
| 2006/0229186 A1 * | 10/2006 | Uehara et al. | ............... | 501/78 |
| 2008/0220961 A1 * | 9/2008 | Uehara et al. | ............... | 501/78 |
| 2009/0069162 A1 * | 3/2009 | Shimizu | ............... | 501/4 |

FOREIGN PATENT DOCUMENTS

| | | | |
|---|---|---|---|
| JP | 03-016932 | | 1/1991 |
| JP | 06-305769 | | 11/1994 |
| JP | 2738744 | | 1/1998 |
| JP | 10226533 A | * | 8/1998 |
| JP | 2002-012443 | | 1/2002 |
| JP | 2002-362938 | | 12/2002 |
| JP | 2003-020249 | | 1/2003 |
| JP | 2003-201142 | | 7/2003 |
| JP | 2003-201143 | | 7/2003 |
| JP | 2003-267748 A | | 9/2003 |
| JP | 2004-161506 | | 6/2004 |
| JP | 2005-15302 A | | 1/2005 |
| JP | 2005015302 A | * | 1/2005 |
| JP | 2005179142 A | * | 7/2005 |
| JP | 2006111482 A | * | 4/2006 |
| WO | WO 2005102949 A2 | * | 11/2005 |
| WO | WO 2005118498 A1 | * | 12/2005 |

OTHER PUBLICATIONS

Machine Translation and Derwent Abstract 1995-019016 of JP 06-305769 A, Nov. 1, 1994.*
Machine Translation and Derwent Abstract 2003-674644 of JP 2003-201142 A, Jul. 15, 2003.*
JOGIS17-1982, "Measuring Method for Internal Transmittance of Optical Glass," 1982, pp. 1-2, English Translation: 1 page.
Machine Translation of JP 2003-267748.
Machine Translation of JP 2005-015302.
Office Action for counter-part foreign application dated Sep. 13, 2011.

* cited by examiner

Primary Examiner — Karl Group
Assistant Examiner — Elizabeth A Bolden
(74) Attorney, Agent, or Firm — Hoffman & Baron, LLP

(57) ABSTRACT

A glass composition that simultaneously has a low temperature coefficient of refractive index and a good light transmittance, being suitable for use in environments of intense temperature change. There is provided an optical glass containing $SiO_2$, $B_2O_3$ and $La_2O_3$, which has a temperature coefficient (20° to 40° C.) of relative refractive index (546.07 nm) of $10.0 \times 10^{-6}$ (° $C.^{-1}$) or below. Further, there is provided an optical glass mentioned above having a temperature coefficient (20° to 40° C.) of relative refractive index (546.07 nm) of $4.6 \times 10^{-6}$ (° $C.^{-1}$) or below. Still further, there is provided an optical glass mentioned above having an internal transmittance ($\tau$;10 mm) at 400 nm of 80% or higher.

19 Claims, No Drawings

OPTICAL GLASS

TECHNICAL FIELD

The present invention relate to optical glass containing $SiO_2$, $B_2O_3$, and $La_2O_3$, that have lower temperature coefficients of relative refractive index and higher light transmittivities.

BACKGROUND ART

In recent years, more precise accuracy in terms of optical element shape has been demanded along with miniaturizing and thinning of optical elements such as of digital cameras and portable equipment. That is, the technology has been progressing by which highly-precise processed lenses are highly precisely assembled. In such highly-precise optical systems, the effect on performance degradation due to temperature change is unlikely to be ignorable.

Among others, simulation on the basis of temperature analysis is essential for portable or in-car products that are assumed to be used under conditions of rapid temperature change in particular. The temperature analysis of conventional optical systems has been often investigated for exclusively highly-precise optical systems such as steppers in large part of semiconductor fields, etc.

In the new fields described above, however, there has been a growing necessity to consider refractive index change with temperatures of optical materials themselves, thermal expansion coefficient, and expansion coefficient of lens-supporting materials. Accordingly, such an optical material has been demanded that has lower thermal expansion coefficients and lower refractive index change with temperature change.

The temperature coefficient of refractive index, employed in temperature analysis of optical materials, is defined as dn/dT, which indicates a relation between temperature and refractive index. The temperature coefficient of refractive index depends on the measuring wavelength and its temperature region, and is expressed in terms of the temperature coefficient of relative refractive index in air at the same temperature with the glass (dn/dT relative, 101.3 kPa, in dry air) and the temperature coefficient of absolute refractive index in vacuum (dn/dT absolute).

Glasses, containing a large amount of $La_2O_3$ having features of lower dispersibility and higher transmittancy, etc., typically have a higher dn/dT and, those having lower values thereof are far from practical use. In a region of shorter wavelengths, dn/dT tends to change considerably and thereby degrades performance.

In general, absorption edges of optical materials tend to shift toward the longer wavelength side from UV region to the visible region as their refractive indices are higher. That is, glasses of higher refractive indices tend to deteriorate their transmissive properties at the region of shorter wavelengths. No substantial absorption is recognizable in the visible region of the longer wavelength side from absorption edges in conventional optical glasses, and therefore those having proper transmissive properties at the near-UV region typically have proper light transmittancy in the visible region. In addition, the UV ray of wavelength 400 nm or visual light near the UV ray have been widely applied to input information to optical magnetic recording media in order to increase memory capacity. Accordingly, the requirement for glass having higher UV transmissive properties is very high.

When used for lenses to project UV rays, astrometric telescopes, etc., materials are also demanded that have solarization resistance.

In recent years, the technology to save weight or miniaturize optical elements has been applied to many products by way of making use of aspheric surface produced by mold-press shaping optical elements of portable equipment such as digital cameras and cellular telephones. However, when the aspheric surface is to be obtained by conventional grinding and polishing processes, many highly expensive and complicated operating processes are necessary. Therefore, such a method is employed that directly shapes lenses, using an ultra-precisely finished mold tool, from preform materials that are produced by way of dropping molten glass or grinding and polishing plate glass. The lenses can be produced by such a method at lower cost and with quick delivery. The molding method, referred to as glass mold, has been thoroughly researched and developed, and as a result, aspheric lenses by the glass mold employed in optical equipment tend to increase year by year.

For these glasses, low-temperature softening glasses are required for the employed glass in view of heat resistance of mold tools used in the glass mold. However, the Tg of conventional glasses, containing $SiO_2$, $B_2O_3$, and $La_2O_3$, is typically above 600° C., and thus glass satisfactory for the heat resistance of press molds has not existed heretofore.

In regards to optical glasses containing $SiO_2$, $B_2O_3$, and $La_2O_3$, Patent Document 1 discloses an optical glass for precision press lenses that contains F (fluorine) as an essential component. In addition, Patent Document 2 discloses an optical glass that contains $SiO_2$, $B_2O_3$, ZnO, and $La_2O_3$ as its essential components.

Patent Document 1: Japanese Examined Patent Application Publication No. 2738744

Patent Document 2: Japanese Unexamined Patent Application Publication No. 2004-161506

Patent Document 3: Japanese Unexamined Patent Application Publication No. 2004-161506

Patent Document 4: Japanese Unexamined Patent Application Publication No. 2003-201143

DISCLOSURE OF THE INVENTION

Problems to be Solved by the Invention

However, the optical glasses described in Patent Document 1 are in some instances insufficient with respect to chemical resistance or devitrification resistance because of all excessively containing the fluorine component. In addition, the optical glasses described in Patent Document 2 are in some instances inadequate for use under various temperature conditions because of all having a larger temperature coefficient of the refractive index dn/dt.

Furthermore, the optical glasses described in Patent Document 3 and 4 are in some instances inadequate for use under various temperature conditions because of the larger temperature coefficient of the refractive index dn/dt.

The present invention has been made to solve the problems described above; it is an object of the present invention to provide an optical glass that exhibits less performance degradation under temperature change and has high light transmittivity.

Means for Solving the Problems

The present inventors have researched thoroughly in order to solve the problems described above, and consequently found that the temperature coefficient of relative refractive index can be reduced by way of adjusting the composition within a certain range. It has also been found that this optical glass exhibits a proper transmissivity at the near-UV region and also remarkably less solarization, thus achieving the present invention.

In a first aspect of an optical glass including $SiO_2$, $B_2O_3$, and $La_2O_3$, a temperature coefficient (20° C. to 40° C.) of a relative refractive index (546.07 nm) is no higher than $10.0 \times 10^{-6}$ (° C.$^{-1}$).

In a second aspect of the optical glass according to the first aspect, the temperature coefficient (20° C. to 40° C.) of the relative refractive index (546.07 nm) is no higher than $4.6 \times 10^{-6}$ (° C.$^{-1}$).

In a third aspect of the optical glass according to the first or second aspect, internal transmissivity ($\tau$ 10 mm) thereof at 400 nm is no less than 80%.

In a fourth aspect of the optical glass according to any one of the first to third aspects, the internal transmissivity ($\tau$ 10 mm) thereof at 400 nm is no less than 95%.

In a fifth aspect of the optical glass according to any one of the first to fourth aspects, solarization is less than 2.0%.

In a sixth aspect, the optical glass according to any one of first to fifth aspects includes no less than 0.1% of $TiO_2$ component.

In a seventh aspect of the optical glass according to any one of the first to sixth aspects, an average linear expansion coefficient at 100° C. to 300° C. is no higher than 95 ($10^{-7} \times$ ° C.$^{-1}$).

In an eighth aspect, the optical glass according to any one of first to seventh aspects contains $Li_2O$.

In a ninth aspect of the optical glass according to any one of first to eighth aspects, a glass transition temperature (Tg) thereof is no higher than 580° C.

In a tenth aspect of the optical glass according to any one of first to ninth aspects, a yielding point (At) is no higher than 620° C.

In an eleventh aspect of the optical glass according to any one of first to tenth aspects, a devitrification temperature of the glass is no higher than 1100° C.

In a twelfth aspect, the optical glass according to any one of the first to eleventh aspects containing, by mass % on the basis of oxides, components:
$SiO_2$ in 4% to 15%;
$B_2O_3$ in 15% to 28%;
$Li_2O$ in 0.1% to 6%;
$La_2O_3$ in 13% to 35%;
$ZrO_2$ in 2% to 8%;
$Ta_2O_5$ in 1% to 10%;
ZnO in 1% to 20% and at least one of
$Gd_2O_3$ in 0% to 30% and
$Y_2O_3$ in 0% to 15%.

In a thirteenth aspect, the optical glass according to any one of the first to twelfth aspects containing, by mass on the basis of oxides, at least one of the components:
$TiO_2$ in 0% to 5%;
$Nb_2O_5$ in 0% to 5%;
$WO_3$ in 0% to 5%;
MgO in 0% to 5%;
CaO in 0% to 10%;
SrO in 0% to 10%;
BaO in 0% to 10%;
$GeO_2$ in 0% to 10%;
$Al_2O_3$ in 0% to 5%;
$Yb_2O_3$ in 0% to 10%;
$Na_2O$ in 0% to 10%;
$K_2O$ in 0% to 10%; and
$Sb_2O_3$ in 0% to 10%.

In a fourteenth aspect, a preform for mold press shaping consists of the optical glass according to any one of the first to thirteenth aspects.

In a fifteenth aspect, an optical element is obtained by shaping and processing the preform according to the fourteenth aspect.

In a sixteenth aspect, an optical element is obtained by shaping and processing the optical glass according to any one of the first to fourteenth aspects.

Effects Of The Invention

In accordance with an embodiment of the present invention, the temperature coefficient relative refractive index is lower and the expansion coefficient is lower; therefore, the performance degradation of optical equipments due to temperature change can be suppressed.

PREFERRED MODE FOR CARRYING OUT THE INVENTION

The reasons to define the values of the physical properties as described above are explained in the following.

The temperature coefficient of the refractive index, employed in temperature analysis of optical materials, is defined as dn/dT, which indicates a relation between temperature and refractive index. The temperature coefficient of refractive index depends on the measuring wavelength and its temperature region, and is expressed in terms of the temperature coefficient of relative refractive index in air at the same temperature with the glass (dn/dT relative, 101.3 kPa, in dry air) and the temperature coefficient of the absolute refractive index in vacuum (dn/dT absolute). In this description, dn/dt relative is measured using a wavelength of 546.07 nm (e ray) in a range of +20° C. to 40° C.

Preferably, the optical glass of the present invention has a dn/dT (° C.$^{-1}$) (546.07 nm, 20° C. to 40° C.) of no higher than $10.0 \times 10^{-6}$. When materials having a dn/dT (° C.$^{-1}$) (546.07 nm, 20° C. to 40° C.) of higher than $10.0 \times 10^{-6}$ are used for optical systems, the performance tends to degrade due to temperature change and it may be difficult to maintain sufficient performance under conditions of rapid temperature change. When considering optical systems of portable instruments or in-car and other highly precise ones in particular, the dn/dT is preferably no higher than $10.0 \times 10^{-6}$, more preferably no higher than $6.0 \times 10^{-6}$, and most preferably no higher than $4.6 \times 10^{-6}$.

Preferably, the optical glass of the present invention has a linear expansion coefficient ($10^{-7} \times$ ° C.$^{-1}$) at 100° C. to 300° C. of no higher than 95. When materials having a linear expansion coefficient ($10^{-7} \times$ ° C.$^{-1}$) of higher than 95 are used for optical systems, the performance tends to degrade due to temperature change and it may be difficult to maintain sufficient performance under the conditions of rapid temperature change. When considering applications such as of portable instruments and in-car in particular, the thermal expansion coefficient at 100° C. to 300° C. is preferably no higher than 95 ($10^{-7} \times$ ° C.$^{-1}$), more preferably no higher than 94 ($10^{-7} \times$ ° C.$^{-1}$), and most preferably no higher than 93 ($10^{-7} \times$ ° C.$^{-1}$).

Preferably, the optical glass of the present invention has an internal transmissivity of at least 80% to lights of about 400 nm in particular. In recent years, solid image pickup devices have been used in cellular telephones, digital cameras, etc. to amplify sensitivity at shorter wavelengths.

However, when the internal transmissivity (10 mm) at 400 nm is less than 80%, the lights of shorter wavelengths tend to attenuate before reaching the image pickup devices and it may be difficult to maintain sufficient performance. Furthermore, when blue lights are excessively amplified by the image pickup devices, it may be difficult to obtain natural images. It is, therefore, preferable that the internal transmissivity (10 mm) at 400 nm is no less than 80%, more preferably no less than 90%, and most preferably no less than 95%.

Preferably, the optical glass of the present invention has a solarization of no higher than 2.0%. When materials having an excessively large solarization are installed into optical equipment, color balance tends to degrade with time depending on the conditions in use and initial image performance may not be maintained. Higher operating temperatures tend to cause solarization more frequently in particular; it is therefore necessary to take care when used under higher temperatures such as in-car. It is, therefore, preferred for the optical equipment to be far from the problems described above so that the solarization is no higher than 2.0%, more preferably no higher than 1.5%, and most preferably no higher than 1.0%.

In this description, "solarization" represents a degraded amount of spectral transmittance when high-pressure mercury lamps irradiate thereon, specifically, measured in accordance with the "method of measuring solarization of optical glass" of JOGIS04-$^{1994}$ defined by the Japan Optical Glass Industry Association.

As described above, the glass of the present invention can be used as preforms for mold press shaping, or the molten glass can be directly pressed. When it is used as a preform material, the production method and the mold press shaping method is not specifically limited, and conventional production methods and shaping methods are available. In regards to the method of producing the preform material, for example, the production apparatus of glass press articles and production method thereof described in Japanese Unexamined Patent Application, First Publication No. Hei 06-157051 and the production method of optical glass and the production apparatus thereof described in Japanese Unexamined Patent Application, First Publication No. Hei 11-157849 may be used.

As described above, not only the method to produce directly the preform material from the molten glass, but also the preform material may be obtained from shaped gobs or blocks through a grinding and polishing step, and then subjected to mold press shaping.

Preferably, the optical glass of the present invention has a refractive index of no less than 1.65. The reason is that when glasses having a refractive index of less than 1.65 are applied to lenses, the curvature radius of the lenses needs to be lowered and spherical aberration tends to increase, and thus the lenses are likely to be inadequate for miniaturized and thinned optical equipment. In addition, when the refractive index is higher than 1.9, light transmittivity and/or devitrification resistance may degrade since glass shaping oxides such as $SiO_2$ and $B_2O_3$ components as main raw materials of glasses are to be decreased. It is, therefore, preferred that the lower limit of the refractive index is 1.65, more preferably 1.70, and most preferably 1.73. In addition, it is, therefore, preferred that the upper limit of the refractive index is 1.90, more preferably 1.80, and most preferably 1.76.

Preferably, the optical glass of the present invention has an Abbe number of no higher than 60. For the purpose of increasing the Abbe number to higher than 60, rare earth oxides such as $La_2O_3$ and $Gd_2O_3$ should be added excessively, which may degrade the devitrification resistance and be impossible to suppress crystal generation thereof. In addition, it may not be possible to sufficiently correct color aberration by making use of low dispersibility for materials having an Abbe number of less than 35. It is, therefore, preferred that the lower limit of the Abbe number is 35, more preferably 45, and most preferably 48. It is also preferred that the upper limit of the Abbe number is 60, more preferably 56, and most preferably 51.

Preferably, the optical glass of the present invention has a glass transition temperature (Tg) of no higher than 630° C. The reason is that glasses having a Tg of higher than 630° C. may be inadequate for mold pressing since the temperature required at press shaping may be higher than the heat resistant temperature of the molds in use. In order to be useful for mold pressing, the Tg is preferably no higher than 630° C., more preferably no higher than 600° C., and most preferably no higher than 580° C.

Preferably, the optical glass of the present invention has a yielding point (At) of no higher than 670° C. Glasses having an At of higher than 670° C. are likely to be inadequate for mold pressing by the reason described above. It is, therefore, preferred that yielding point is no higher than 670° C., more preferably no higher than 650° C., and most preferably no higher than 620° C.

Preferably, the inventive optical glass has a devitrification temperature of no higher than 1100° C. Glasses having a devitrification temperature of higher than 1100° C. are likely to the raise load of apparatuses since the temperature range of the shaping processes becomes higher. In addition, the temperature range in which shaping is possible is limited. It is, therefore, preferred that the devitrification temperature is no higher than 1100° C., more preferably no higher than 1070° C., and most preferably no higher than 1050° C.

The reasons to limit the compositional ranges of % by mass on the basis of oxides with respect to the components of the glass composition according to the present invention are explained in the following.

In this description, "on the basis of oxides" represents a composition where the raw materials of the constitutional components of the glass of the present invention, such as oxides, carbonates, and nitrates, are assumed to all be completely converted into oxides at melting steps through decomposition, and each component is expressed by the content of by mass based on 100% by mass of total mass of the resulting oxides.

In this description, "not substantially contain" means no inclusion as a composition of the raw materials, that is, indicates that the component is not included intentionally and does not exclude a case where the component is intermixed as an impurity.

The $SiO_2$ component is a glass forming oxide and is useful to form a glass skeleton; however, an excessively large amount thereof may decrease the refractive index and degrade the solarization. It is, therefore, preferred that the lower limit of the $SiO_2$ component is 4.0%, more preferably 4.5%, and most preferably 7.0%. It is also preferred that the upper limit of the $SiO_2$ component is 15.0%, more preferably 13.0%, and most preferably 11.0%.

The $B_2O_3$ component is an indispensable component as a glass forming oxide for the optical glass of the present invention containing a rare earth oxide. An excessively small amount thereof may lead to the effect described above being insufficient or decrease the refractive index and cause the solarization. An excessively large amount thereof may lower the refractive index. It is, therefore, preferred that the lower limit of the $B_2O_3$ component is 15%, more preferably 17%, and most preferably 19%. It is also preferred that the upper limit of the $B_2O_3$ component is 28%, more preferably 26%, and most preferably 24%.

The $Li_2O$ component has a significant effect to decrease the temperature coefficient of the relative refractive index. There is also an effect to lower the devitrification temperature and to decease Tg. An excessively small amount thereof may lead to the effect described above being insufficient and an excessively large amount thereof tends to degrade the solarization. It is, therefore, preferred that the lower limit of the $Li_2O$ component is 0.1%, more preferably 1.5%, and most preferably 3.1%. It is also preferred that the upper limit of the $Li_2O$ component is 6.0%, more preferably 5.0%, and most preferably 3.8%.

The $Na_2O$ component or the $K_2O$ component is an optional component having an effect to lower Tg; however, an excessively large amount of either thereof tends to raise the devitrification temperature to make vitrification difficult. It is, therefore, preferred that the upper limit of the $Na_2O$ component or the $K_2O$ component is 10.0%, more preferably 5.0%, and most preferably 1.0%.

The $La_2O_3$ component is an indispensable component to raise the refractive index of the glass and also to maintain the light transmitivity. There also exists an effect to increase the Abbe number. An excessively small amount thereof may lead to the effect described above being insufficient and an excessively large amount thereof tends to raise the temperature coefficient of the relative refractive index. It is, therefore, preferred that the lower limit of the $La_2O_3$ component is 13%, more preferably 17%, and most preferably 21%. In addition, it is preferred that the upper limit of the $La_2O_3$ component is 35%, more preferably 31%, and most preferably 27%.

The $Gd_2O_3$ component, which is not a problem at a content of 0%, may coexist with the $La_2O_3$ component to impart a similar effect and also to affect the devitrification resistance. However, an excessively large amount thereof tends to raise the devitrification temperature. It is, therefore, preferred that the lower limit of the $Gd_2O_3$ component is 0.1%, more preferably 5.0%, and most preferably 10%. It is also preferred that the upper limit of the $Gd_2O_3$ component is 30%, more preferably 26%, and most preferably 20%.

The $Y_2O_3$ component may exhibit a similar effect with replacing the $Gd_2O_3$ component described above; an excessively small amount thereof may lead to an insufficient effect and an excessively large amount thereof tends to raise the devitrification temperature. It is, therefore, preferred that the lower limit of the $Y_2O_3$ component is 0.1%, more preferably 2.0%, and most preferably 3.5%. It is also preferred that the upper limit of the $Y_2O_3$ component is 15%, more preferably 10%, and most preferably 8.0%.

The present inventors have found that when the total amount of $La_2O_3$, $Gd_2O_3$, and $Y_2O_3$ components is higher than 55%, the temperature coefficient of the relative refractive index becomes large. It is, therefore, preferred that the lower limit of the total amount of $La_2O_3$, $Gd_2O_3$, and $Y_2O_3$ components is 55%, more preferably 50%, and most preferably 40% so as to properly maintain the temperature coefficient of relative refractive index.

The $ZrO_2$ component may provide the glass with an effect to lower the devitrification temperature, to suppress crystallization, and to improve chemical resistance. An excessively small amount thereof may lead to the effect described above being insufficient and an excessively large amount thereof tends to generate crystalline substances in the glass. It is, therefore, preferred that the lower limit of the $ZrO_2$ component is 2.0%, more preferably 2.5%, and most preferably 3.0% in order to take the effect. It is also preferred that the upper limit of the $ZrO_2$ component is 8.0%, more preferably 7.0%, and most preferably 6.0%.

The $Al_2O_3$, component, which is an optional component, may exhibit a similar effect to that of the $ZrO_2$ component. However, an excessively large amount thereof tends to adversely raise Tg and make vitrification difficult. It is, therefore, preferred that the upper limit of the $Al_2O_3$ component is 5%, more preferably 3.0%, and most preferably 1.5% in order to take the effect.

The $TiO_2$ component is an optional component that may exhibit a remarkably great effect to increase the refractive index and a small amount thereof may impart an effect to lower the devitrification temperature and to improve the solarization; however, an excessively large amount thereof tends to degrade the light transmittivity. It is, therefore, preferred that the upper limit of the $TiO_2$ component is 5.0%, more preferably 3.0%, and most preferably 1.0%.

The $Nb_2O_3$ component is an optional component that may exert a significant effect to raise the refractive index and to lower the devitrification temperature; however, an excessively large amount thereof may lower the Abbe number. It is, therefore, preferred that the upper limit of the $Nb_2O_3$ component is 5%, more preferably 3.0%, and most preferably 1.5% in order to easily impart the effect.

The $Ta_2O_3$ component is an optional component that may impart a significant effect to raise the refractive index and to lower the devitrification temperature; however, an amount above 10% may lower the Abbe number. It is, therefore, preferred that the lower limit of the $Ta_2O_3$ component is 1.0%, more preferably 2.0%, and most preferably 3.0% in order to easily impart the effect. It is also preferred that the upper limit of the $Ta_2O_3$ component is 10.0%, more preferably 8.0%, and most preferably 6.0%.

The $WO_3$ component is an optional component that may impart an effect to adjust the refractive index and to lower the devitrification temperature; however, an excessively large amount thereof is likely to easily deteriorate the light transmittivity. It is, therefore, preferred that the upper limit of the $WO_3$ component is 5.0%, more preferably 3.0%, and most preferably 2.0%.

The $Yb_2O_3$ component is an effective component to raise the refractive index of the glass and to increase the Abbe number similarly as the $Gd_2O_3$ component. When the $Yb_2O_3$ component is contained in an excessively large amount, however, the devitrification resistance may be easily impaired. It is, therefore, preferred that the upper limit of the $Yb_2O_3$ component is 10%, more preferably 5.0%, and most preferably less than 3.0%.

The $GeO_2$ component is an effective component to raise the refractive index and to enhance the devitrification resistance; however, since the raw material is expensive, the amount used is limited. It is, therefore, preferred that the upper limit of the $GeO_2$ component is 10%, more preferably 5%, and most preferably less than 3%.

The ZnO component has an effect to lower the devitrification temperature and to decrease Tg; however, an excessively large amount thereof is likely to deteriorate the chemical resistance. It is, therefore, preferred that the lower limit of the ZnO component is 1.0%, more preferably 3.0%, and most preferably 5.0%. It is also preferred that the upper limit of the ZnO component is 20%, more preferably 17%, and most preferably 10%.

The CaO component is an optional component that may exert an effect, similarly to the ZnO component, to lower the devitrification temperature and to decrease Tg and specific gravity; however, an excessively large amount thereof is likely to deteriorate the devitrification resistance. It is, therefore, preferred that the upper limit of the CaO component is 10%, more preferably 8%, and most preferably 5%.

The BaO component is an optional component that may exert an effect to lower the devitrification temperature and to adjust the optical constant; however, an excessively large amount thereof is likely to deteriorate the devitrification resistance. It is, therefore, preferred that the upper limit of the BaO component is 10%, more preferably 8%, and most preferably 6%.

The SrO component is an optional component that is useful to lower the devitrification temperature and to adjust the refractive index; however, an excessively large amount thereof is likely to deteriorate the devitrification resistance. It is, therefore, preferred that the upper limit of the SrO component is 10%, more preferably 5.0%, and most preferably 3%.

The MgO component is an optional component to lower the melting temperature; however, content above 5% tends to deteriorate stability to devitrification and to increase the phase splitting tendency. It is, therefore, preferred that the upper limit of the MgO component is 5%, and more preferably 2%.

The $Sb_2O_3$ component has a defoaming effect in glass melting processes, and the amount is preferably less than 10%.

The F component has a significant effect to improve the light transmittivity and to lower the temperature coefficient of the relative refractive index. However, an excessively large amount thereof may form nonuniform portions due to evaporation from the glass surface in the temperature range of shaping processes. It is, therefore, preferred that the upper limit of the F component is 10%, more preferably 5.0%, and most preferably 3.0%.

Furthermore, adding the $Cs_2O$ component in order to adjust the optical constant is not a problem; however, the component is undesirable to produce inexpensive glasses since the raw material is expensive.

Moreover, adding the $Bi_2O_3$ or $TeO_2$ component in order to raise the refractive index and to lower Tg is not a problem; however, the inclusion is to be excluded when the light transmittivity is impaired.

In addition, transition metal components such as V, Cr, Mn, Fe, Co, Ni, Cu, and Mo, except for Ti, bring about coloring even in a small mount since absorption appears at a certain wavelength of the visible region. Optical glasses, which use a wavelength in the visible region, should not substantially contain them.

Furthermore, adding Pb and Th components in order to raise the refractive index and to enhance stability as glass is not a problem. Moreover, there is no problem in adding Cd and Tl components in order to lower Tg. In addition, adding the As component in order to make clear or uniform glasses is not a problem. On the other hand, Pb, Th, Cd, Tl, and As tend not to be used in recent years from the viewpoint of being harmful chemical substances, and provision for environmental measures is necessary in glass production processes as well as working processes and disposal after providing products; therefore, they are not added when possible.

Although the compositional range of the glass composition according to the present invention is expressed by mass %, and thus is impossible to be represented directly by mol %, the oxides existing in the glass composition, which are satisfactory for various properties required in the present invention, approximately have the following compositional values in the expression by mol %. The values by mol % are merely for reference, to which the ranges in the embodiments of the present invention described above should not be limited:

10 to 20 mol % $SiO_2$,
30 to 40 mol % $B_2O_3$,
1 to 15 mol % $Li_2O$,
3 to 10 mol % $La_2O_3$,
0 to 5 mol % $Gd_2O_3$,
0 to 5 mol % $Y_2O_3$,
0 to 3 mol % $TiO_2$,
0.1 to 5 mol % $Ta_2O_5$,
0 to 20 mol % RO, (R=Mg, Ca, Sr, Ba, Zn), and
0 to 3 mol % $Sb_2O_3$.

EXAMPLES

Compositions of preferable Examples Nos. 1 to 34 of the optical glasses of the present invention and compositions of conventional glasses of Comparative Examples Nos. A to F containing $SiO_2$, $B_2O_3$, and $La_2O_3$ are shown in Tables 1 to 6 along with optical constants (nd, νd), glass transition temperatures Tg, yielding points At, and linear expansion coefficients thereof. In addition, the temperature coefficient of relative refractive index (546.07 nm), internal transmissivity at 400 nm, solarization at 80% transparent wavelength, and devitrification temperature are also shown in Table 6.

The glasses of Examples Nos. 1 to 34 were processed such that conventional raw materials of optical glasses such as oxides, carbonates, and nitrates were weighed and mixed in a predetermined rate, then poured into a platinum crucible and melted, defoamed, and stirred to be uniform at temperatures of 1200° C. to 1400° C. for 2 to 4 hours depending on the melting properties of the glass compositions. In regards to glasses containing the F component, the glass component was suppressed to vaporize at the melting step by lidding thereto with a material like Pt. Thereafter, the glasses are casted into a mold, etc. after lowering the temperature, thereby easily obtaining glasses with excellent uniformity.

The temperature coefficient of relative refractive index (dn/dT rel.) refers to a temperature coefficient of relative refractive index within air of the same temperature as that of the glass, and is expressed by a variation per 1° C. ($\times 10^{-6}$/° C.). The measuring method was in accordance the interference method in "method of measuring temperature coefficient of relative refractive index of optical glass" of JOGIS18-$^{1994}$ defined by the Japan Optical Glass Industry Association.

The internal transmissivity was measured in accordance with "method of measuring internal transmissivity of optical glass" of JOGIS17-$^{1982}$ defined by the Japan Optical Glass Industry Association. In this regard, the samples had a thickness of 50 mm or 10 mm, and their opposing parallel surfaces were polished. In this description, the spectral transmittance at 400 nm with no reflectance loss was expressed by rounding the second place after decimal point.

The solarization was measured in accordance with "method of measuring solarization of optical glass" of JOGIS04-$^{1994}$ defined by the Japan Optical Glass Industry Association.

The average linear expansion coefficient (100° C. to 300° C.) was obtained in accordance with "method of measuring thermal expansion of optical glass" of JOGIS08-$^{2003}$ defined by the Japan Optical Glass Industry Association as a linear expansion coefficient at 100° C. to 300° C.

The glass transition temperature (Tg) and the yielding point (At) were determined from a thermal expansion curve that was obtained by measuring temperature and elongation of samples described above in accordance with "method of measuring thermal expansion of optical glass" of JOGIS08-$^{2003}$ defined by the Japan Optical Glass Industry Association.

The devitrification temperature was measured by way of placing a sample in a temperature-graded furnace with a temperature gradient of 1000° C. to 1150° C. for 30 minutes, then observing for the existence or nonexistence of crystals using a microscope of 100 times magnification. The devitrification temperature was determined as the highest temperature at which crystals were observed.

TABLE 1

|  | Ex. 1 | Ex. 2 | Ex. 3 | Ex. 4 | Ex. 5 | Ex. 6 |
|---|---|---|---|---|---|---|
| $SiO_2$ | 10.80 | 10.80 | 8.60 | 8.60 | 6.60 | 7.60 |
| $B_2O_3$ | 22.60 | 19.70 | 22.10 | 22.70 | 22.70 | 22.70 |
| $Al_2O_3$ | | | | | | |
| $Y_2O_3$ | 12.00 | 5.00 | 5.00 | 5.00 | 5.00 | 5.00 |
| $La_2O_3$ | 30.60 | 23.60 | 23.30 | 23.30 | 23.30 | 23.30 |
| $Gd_2O_3$ | | 15.00 | 15.00 | 15.00 | 15.00 | 12.95 |
| $Yb_2O_3$ | | | | | | |
| $TiO_2$ | | | 0.10 | | | |
| $ZrO_2$ | 5.00 | 4.35 | 4.40 | 4.40 | 3.35 | 3.40 |
| $Nb_2O_5$ | 0.50 | | | | | |
| $Ta_2O_5$ | 5.00 | 4.50 | 4.50 | 4.50 | 4.50 | 4.50 |
| $WO_3$ | | | | | | |
| ZnO | 5.45 | 6.00 | 6.00 | 6.00 | 9.00 | 8.00 |
| MgO | | | | | | |
| CaO | | 2.50 | 2.50 | 2.45 | 2.50 | 4.50 |
| BaO | 5.00 | 5.00 | 5.00 | 5.00 | 5.00 | 5.00 |
| SrO | | | | | | |
| $Li_2O$ | 3.00 | 3.50 | 3.50 | 3.00 | 3.00 | 3.00 |
| $Na_2O$ | | | | | | |
| $K_2O$ | | | | | | |
| $Sb_2O_3$ | 0.05 | 0.05 | | 0.05 | 0.05 | 0.05 |
| Total | 100.00 | 100.00 | 100.00 | 100.00 | 100.00 | 100.00 |
| Tg | 560 | 548 | 533 | | | |
| At | 604 | 585 | 573 | | | |
| α | | 91 | | | | |
| $n_d$ | 1.7417 | 1.7422 | 1.7420 | 1.7417 | 1.7467 | 1.7427 |

TABLE 2

|  | Ex. 7 | Ex. 8 | Ex. 9 | Ex. 10 | Ex. 11 | Ex. 12 |
|---|---|---|---|---|---|---|
| $SiO_2$ | 6.60 | 6.60 | 6.60 | 4.00 | 6.00 | 8.00 |
| $B_2O_3$ | 24.70 | 22.70 | 22.70 | 26.20 | 26.20 | 26.20 |
| $Al_2O_3$ | | | | | | |
| $Y_2O_3$ | 5.00 | 5.00 | 5.00 | | | |
| $La_2O_3$ | 23.30 | 20.30 | 20.30 | 31.95 | 21.95 | 20.45 |
| $Gd_2O_3$ | 15.00 | 15.00 | 15.00 | 11.10 | 20.10 | 19.10 |
| $Yb_2O_3$ | | | | 9.60 | 8.60 | 9.60 |
| $TiO_2$ | | | | | | |
| $ZrO_2$ | 4.35 | 3.40 | 3.40 | 4.90 | 4.90 | 3.90 |
| $Nb_2O_5$ | | | | | | |
| $Ta_2O_5$ | 4.50 | 4.45 | 4.50 | 3.50 | 3.50 | 4.00 |
| $WO_3$ | | | | | | |
| ZnO | 6.00 | 9.00 | 9.00 | 6.20 | 6.20 | 6.20 |
| MgO | | | | | | |
| CaO | 2.50 | 5.50 | 2.50 | | | |
| BaO | 5.00 | 5.00 | 8.00 | | | |
| SrO | | | | | | |
| $Li_2O$ | 3.00 | 3.00 | 3.00 | 2.50 | 2.50 | 2.50 |
| $Na_2O$ | | | | | | |
| $K_2O$ | | | | | | |
| $Sb_2O_3$ | 0.05 | 0.05 | | 0.05 | 0.05 | 0.05 |
| Total | 100.00 | 100.00 | 100.00 | 100.00 | 100.00 | 100.00 |
| Tg | | | | 540 | 570 | 580 |
| At | | | | 590 | 600 | 610 |
| α | | | | 76 | | |
| $n_d$ | 1.7420 | 1.7404 | 1.7413 | 1.7631 | 1.7574 | 1.7427 |
| $v_d$ | 49.8 | 49.2 | 49.2 | 48.9 | 51.3 | 51.4 |

TABLE 3

|  | Ex. 13 | Ex. 14 | Ex. 15 | Ex. 16 | Ex. 17 | Ex. 18 |
|---|---|---|---|---|---|---|
| $SiO_2$ | 8.75 | 8.75 | 8.75 | 8.75 | 8.75 | 8.75 |
| $B_2O_3$ | 24.20 | 27.20 | 27.20 | 27.20 | 27.40 | 27.40 |
| $Al_2O_3$ | | | | | | 0.50 |
| $Y_2O_3$ | | | | | | |
| $La_2O_3$ | 14.20 | 18.80 | 16.20 | 17.80 | 23.60 | 23.10 |
| $Gd_2O_3$ | 27.10 | 27.10 | 29.70 | 26.10 | 20.10 | 20.60 |
| $Yb_2O_3$ | 4.60 | | | | | |
| $TiO_2$ | | | | | | |

TABLE 3-continued

|  | Ex. 13 | Ex. 14 | Ex. 15 | Ex. 16 | Ex. 17 | Ex. 18 |
|---|---|---|---|---|---|---|
| $ZrO_2$ | 4.90 | 4.90 | 4.90 | 4.95 | 4.95 | 4.90 |
| $Nb_2O_5$ |  |  |  |  |  |  |
| $Ta_2O_5$ | 3.45 | 3.50 | 3.50 | 3.50 | 4.50 | 5.00 |
| $WO_3$ |  |  |  |  |  |  |
| ZnO | 9.30 | 6.20 | 6.20 | 6.20 | 6.20 | 6.20 |
| MgO |  |  |  |  |  |  |
| CaO |  |  |  |  |  |  |
| BaO |  |  |  |  |  |  |
| SrO |  |  |  |  |  |  |
| $Li_2O$ | 3.50 | 3.50 | 3.50 | 5.50 | 4.50 | 3.50 |
| $Na_2O$ |  |  |  |  |  |  |
| $K_2O$ |  |  |  |  |  |  |
| $Sb_2O_3$ |  | 0.05 | 0.05 |  |  | 0.05 |
| Total | 100.00 | 100.00 | 100.00 | 100.00 | 100.00 | 100.00 |
| Tg | 560 | 570 | 570 | 540 | 536 | 569 |
| At | 590 | 600 | 600 | 570 | 575 | 601 |
| α |  |  |  |  | 85 | 78 |
| $n_d$ | 1.7380 | 1.7380 | 1.7359 | 1.7306 | 1.7325 | 1.7373 |
| $v_d$ | 51.1 | 52.6 | 52.7 | 53.4 | 52.3 | 52.1 |

TABLE 4

|  | Ex. 19 | Ex. 20 | Ex. 21 | Ex. 22 | Ex. 23 | Ex. 24 |
|---|---|---|---|---|---|---|
| $SiO_2$ | 5.75 | 5.75 | 5.75 | 5.75 | 5.75 | 4.25 |
| $B_2O_3$ | 24.80 | 24.65 | 24.65 | 24.65 | 24.85 | 26.50 |
| $Al_2O_3$ |  |  |  |  |  |  |
| $Y_2O_3$ |  |  |  |  |  |  |
| $La_2O_3$ | 24.40 | 25.05 | 25.05 | 25.05 | 23.90 | 23.20 |
| $Gd_2O_3$ | 25.10 | 25.10 | 25.10 | 25.15 | 27.10 | 27.10 |
| $Yb_2O_3$ |  |  |  |  |  |  |
| $TiO_2$ |  |  |  |  |  |  |
| $ZrO_2$ | 6.70 | 6.70 | 6.80 | 6.80 | 6.80 | 6.80 |
| $Nb_2O_5$ |  |  |  |  |  |  |
| $Ta_2O_5$ | 3.50 | 3.00 | 3.00 | 3.00 | 3.00 | 3.50 |
| $WO_3$ |  |  |  |  |  |  |
| ZnO | 6.20 | 6.20 | 6.20 | 6.40 | 6.30 | 6.30 |
| MgO |  |  |  |  |  |  |
| CaO |  |  |  |  |  |  |
| BaO |  |  |  |  |  |  |
| SrO |  |  |  |  |  |  |
| $Li_2O$ | 3.50 | 3.50 | 3.40 | 3.20 | 2.30 | 2.30 |
| $Na_2O$ |  |  |  |  |  |  |
| $K_2O$ |  |  |  |  |  |  |
| $Sb_2O_3$ | 0.05 | 0.05 | 0.05 |  |  | 0.05 |
| Total | 100.00 | 100.00 | 100.00 | 100.00 | 100.00 | 100.00 |
| Tg | 546 | 546 | 548 | 563 | 577 |  |
| At | 590 | 590 | 590 | 601 | 616 | 613 |
| α | 83 | 82 | 84 | 82 | 78 | 78 |
| $n_d$ | 1.7645 | 1.7612 | 1.7618 | 1.7628 | 1.7633 | 1.7632 |
| $v_d$ | 49.8 | 49.7 | 49.7 | 49.7 | 49.4 | 49.3 |

TABLE 5

|  | Ex. 25 | Ex. 26 | Ex. 27 |
|---|---|---|---|
| $SiO_2$ | 5.00 | 5.00 | 5.00 |
| $B_2O_3$ | 25.40 | 25.40 | 26.40 |
| $Al_2O_3$ |  |  |  |
| $Y_2O_3$ |  |  |  |
| $La_2O_3$ | 25.55 | 24.55 | 23.55 |
| $Gd_2O_3$ | 25.60 | 25.60 | 25.60 |
| $Yb_2O_3$ |  |  |  |
| $TiO_2$ |  |  |  |
| $ZrO_2$ | 4.80 | 4.80 | 4.80 |
| $Nb_2O_5$ |  |  |  |
| $Ta_2O_5$ | 3.80 | 3.80 | 3.80 |
| $WO_3$ |  |  |  |
| ZnO | 7.80 | 7.60 | 7.80 |
| MgO |  |  |  |
| CaO |  |  |  |
| BaO |  |  |  |
| SrO |  |  |  |
| $Li_2O$ | 2.00 | 3.20 | 3.00 |
| $Na_2O$ |  |  |  |
| $K_2O$ |  |  |  |
| $Sb_2O_3$ | 0.05 | 0.05 | 0.05 |
| Total | 100.00 | 100.00 | 100.00 |
| Tg | 575 | 561 | 557 |
| At | 614 | 590 | 596 |
| α | 76 | 80 | 82 |
| $n_d$ | 1.7633 | 1.7606 | 1.7612 |
| $v_d$ | 49.5 | 49.8 | 49.9 |

TABLE 6

|  | Ex. 28 | Ex. 29 | Ex. 30 | Ex. 31 | Ex. 32 | Ex. 33 | Ex. 34 |
|---|---|---|---|---|---|---|---|
| $SiO_2$ | 7.40 | 7.40 | 5.00 | 5.00 | 8.60 | 8.60 | 8.60 |
| $B_2O_3$ | 19.85 | 19.85 | 25.40 | 25.40 | 22.05 | 22.15 | 24.05 |
| $Al_2O_3$ | | | | | | | |
| $Y_2O_3$ | | | | | 5.00 | 5.00 | 5.00 |
| $La_2O_3$ | 26.50 | 26.50 | 26.55 | 26.55 | 23.30 | 23.30 | 23.30 |
| $Gd_2O_3$ | 21.00 | 11.00 | 25.60 | 15.60 | 15.00 | 15.00 | 15.00 |
| $Gd_2F_3$ | | 10.00 | | 10.00 | | | |
| $TiO_2$ | | | | | 0.10 | | 0.10 |
| $ZrO_2$ | 2.60 | 2.60 | 4.80 | 4.80 | 4.40 | 4.40 | 4.40 |
| $Nb_2O_5$ | | | | | | | |
| $Ta_2O_5$ | 4.00 | 4.00 | 3.80 | 3.80 | 4.50 | 4.50 | 4.50 |
| $WO_3$ | 1.00 | 1.00 | | | | | |
| ZnO | 16.10 | 16.10 | 7.80 | 7.80 | 6.00 | 6.00 | 6.00 |
| MgO | | | | | | | |
| CaO | | | | | 2.50 | 2.50 | 2.50 |
| BaO | | | | | 5.00 | 5.00 | 5.00 |
| SrO | | | | | | | |
| $Li_2O$ | 1.50 | 1.50 | 1.00 | 1.00 | 3.50 | 3.50 | 1.50 |
| $Na_2O$ | | | | | | | |
| $K_2O$ | | | | | | | |
| $Sb_2O_3$ | 0.05 | 0.05 | 0.05 | 0.05 | 0.05 | 0.05 | 0.05 |
| Total | 100.00 | 100.00 | 100.00 | 100.00 | 100.00 | 100.00 | 100.00 |
| $\Delta n/\Delta T$ ($10^{-6}/°C$) | | | | | 4.4 | 4.4 | 5.2 |
| internal transmissivity (%) | 98 | 98 | 99 | 99 | 98 | 99 | 98 |
| solarization (80%) | <0.1 | <0.1 | 1.2 | 0.8 | 0.3 | 0.8 | 0.1 |
| Tg | 560 | 530 | 611 | 589 | 541 | 540 | 591 |
| At | 602 | 589 | 642 | 628 | 581 | 578 | 631 |
| α | 78 | 79 | 75 | 74 | 92 | 90 | 79 |
| $n_d$ | 1.7704 | 1.7546 | 1.7667 | 1.7548 | 1.7416 | 1.7408 | 1.7426 |
| $v_d$ | 47.5 | | 49.2 | | 49.3 | 49.5 | 49.9 |
| devitrification temperature | 1030 | 1015 | 1073 | 1060 | 1025 | 1020 | 1035 |

TABLE 7

|  | Com. Ex. A | Com. Ex. B |
|---|---|---|
| $SiO_2$ | 1.50 | 3.00 |
| $B_2O_3$ | 7.00 | 31.00 |
| $GeO_2$ | 11.30 | |
| $Y_2O_3$ | | 6.00 |
| $La_2O_3$ | 36.20 | 44.50 |
| $Gd_2O_3$ | | 3.00 |
| $Yb_2O_3$ | | |
| $TiO_2$ | 2.00 | |
| $ZrO_2$ | 6.25 | 7.20 |
| $Nb_2O_5$ | 23.65 | |
| $Ta_2O_5$ | 10.00 | 4.00 |
| $WO_3$ | 2.00 | |
| ZnO | | |
| MgO | | |
| CaO | | |
| BaO | | 1.00 |
| SrO | | 1.00 |
| $Li_2O$ | | |
| $Na_2O$ | | |
| $K_2O$ | | |
| $Sb_2O_3$ | 0.10 | 0.10 |
| Total | 100.00 | 100.00 |
| $\Delta n/\Delta T$ ($10^{-6}/°C$) | 10.3 | 8.0 |
| internal transmissivity (%) | 50 | 93.7 |
| solarization (80%) | 2.7 | 0.3 |
| Tg | 710 | 610 |
| At | 735 | 635 |
| α | 68 | 70 |
| $n_d$ | 2.005 | 1.8120 |
| $v_d$ | 28.4 | 39.2 |
| devitrification temperature | 1150° C.≦ | 1130° C. |

As shown in Tables 1 to 6, all of the glasses of the inventive Examples Nos. 1 to 34 satisfy the ranges desirable for a mold press material in terms of the transition temperature (Tg), yielding point (At), refractive index (nd), and Abbe number (vd). Accordingly, the glasses are adequate for a mold-press glass material having a proper refractive index and an Abbe number with maintaining a lower glass transition temperature.

In addition, the temperature coefficient of relative refractive index, thermal expansion coefficient, internal transmissivity, and solarization of Examples No. 28 to 34 are shown in Table 6. All of the glasses have a higher light transmittivity and also a lower temperature coefficient of relative refractive index, and therefore can maintain proper performance even under any conditions of severe temperatures.

Comparative Examples No. A and B represent conventional glasses containing $SiO_2$, $B_2O_3$, and $La_2O_3$. These glasses are inadequate for recent optical equipment advanced in miniaturizing and intricacy because of the higher temperature coefficient of the refractive index, lower internal transmissivity, or higher solarization.

As described above, the optical glasses of the present invention contain $SiO_2$, $B_2O_3$ and $La_2O_3$, and have a lower temperature coefficient of the refractive index, thus exhibiting a significant effect to suppress performance degradation of optical equipment due to temperature change.

In addition, the optical glasses of the present invention express a lower thermal expansion coefficient, which provides a similar effect. Accordingly, they are necessary and indispensable materials for in-car, supervising, or industrial optical equipment, etc. that are assured to be used under high temperature conditions in particular, in addition to portable devices, image apparatuses, etc.

In addition, the optical glasses of the present invention display appropriate solarization resistance, and thus are free from degradation under irradiation of UV rays or other intense solar beams used for curing chemical reactions, sterilization, antisepsis, etc. The present invention can also provide optical glasses and optical parts formed of the optical glasses that remarkably have the appropriate higher refractive indices, lower dispersibility, and light transmittivity. In particular, they are effectively applied to optical systems that utilize a laser of the UV region. In addition, they can be mold-pressed by virtue of having lower glass transition temperatures.

The invention claimed is:

1. An optical glass comprising, by mass % on a basis of oxides, $SiO_2$ in 4.0 to 8.75%, $B_2O_3$ in 15 to 28%, $La_2O_3$ in 13 to 24.4%, and $Gd_2O_3$ in 11.10 to 30%, and $Li_2O$ in 2.30 to 6.0%, and having a content of $WO_3$ of no more than 5.0%, and a content of ZnO of no more than 10%, wherein a temperature coefficient (20° C. to 40° C.) of a relative refractive index (546.07 nm) is no higher than $10.0 \times 10^{-6}$ (° $C.^{-1}$).

2. The optical glass according to claim 1, wherein the temperature coefficient (20° C. to 40° C.) of the relative refractive index (546.07 nm) is no higher than $4.6 \times 10^{-6}$ (° $C.^{-1}$).

3. The optical glass according to claim 1, wherein an internal transmissivity (τ 10 mm) at 400 nm is no less than 80%.

4. The optical glass according to claim 3, wherein the internal transmissivity (τ 10 mm) at 400 nm is no less than 95%.

5. The optical glass according to claim 1, wherein solarization is no higher than 2.0%.

6. The optical glass according to claim 1, further comprising no less than 0.1% of a $TiO_2$ component in terms of oxides.

7. The optical glass according to claim 1, wherein an average linear expansion coefficient in a range of 100° C. to 300° C. is no higher than 95 ($10^{-7} \times$ ° $C.^{-1}$).

8. The optical glass according to claim 1, wherein glass transition temperature (Tg) is no higher than 580° C.

9. The optical glass according to claim 1, wherein a yielding point (At) is no higher than 620° C.

10. The optical glass according to claim 1, wherein a devitrification temperature of the glass is no higher than 1100° C.

11. The optical glass according to claim 1, further comprising, by mass % on the basis of oxides, components:
    $ZrO_2$ in 2% to 8%;
    $Ta_2O_5$ in 1% to 10%;
    ZnO in 1% to 10%; and
    $Y_2O_3$ in 0% to 15%.

12. The optical glass according to claim 1, further comprising, by mass % on the basis of oxides, components:
    $TiO_2$ in 0% to 5%;
    $Nb_2O_5$ in 0% to 5%;
    MgO in 0% to 5%;
    CaO in 0% to 10%;
    SrO in 0% to 10%;
    BaO in 0% to 10%;
    $GeO_2$ in 0% to 10%;
    $Al_2O_3$ in 0% to 5%;
    $Yb_2O_3$ in 0% to 10%;
    $Na_2O$ in 0% to 10%;
    $K_2O$ in 0% to 10%; and
    $Sb_2O_3$ in 0% to 10%.

13. The optical glass according to claim 1, comprising 1.0% to 5.00% $Ta_2O_5$, by mass % on the basis of oxides.

14. A preform for mold press shaping, comprising the optical glass according to claim 1.

15. An optical element, obtained by shaping and processing the preform according to claim 14.

16. An optical element, obtained by shaping and processing the optical glass according to claim 1.

17. An optical glass, comprising, by mass % on the basis of oxides, components:
    $SiO_2$ in 4% to 8.75%;
    $B_2O_3$ in 15% to 28%;
    $Li_2O$ in 2.30% to 6%;
    $La_2O_3$ in 13% to 24.4%;
    $ZrO_2$ in 2% to 8%;
    $Ta_2O_5$ in 1% to 10%;
    ZnO in 1% to 10%;
    $Gd_2O_3$ in 11.10% to 30%;
    $WO_3$ in 0% to 5%; and
    $Y_2O_3$ in 0% to 15%.

18. The optical glass according to claim 17, further comprising, by mass % on the basis of oxides, components:
    $TiO_2$ in 0% to 5%;
    $Nb_2O_5$ in 0% to 5%;
    MgO in 0% to 5%;
    CaO in 0% to 10%;
    SrO in 0% to 10%;
    BaO in 0% to 10%;
    $GeO_2$ in 0% to 10%;
    $Al_2O_3$ in 0% to 5%;
    $Yb_2O_3$ in 0% to 10%;
    $Na_2O$ in 0% to 10%;
    $K_2O$ in 0% to 10%; and
    $Sb_2O_3$ in 0% to 10%.

19. The optical glass according to claim 17, comprising 1.0% to 5.00% $Ta_2O_5$, by mass % on the basis of oxides.

* * * * *